(12) United States Patent
Okabe et al.

(10) Patent No.: US 10,520,710 B2
(45) Date of Patent: Dec. 31, 2019

(54) TELECENTRIC OPTICAL APPARATUS

(71) Applicant: Mitutoyo Corporation, Kawasaki, Kanagawa (JP)

(72) Inventors: Kenji Okabe, kanagawa (JP); Tatsuya Nagahama, kanagawa (JP); Toru Yaku, kanagawa (JP); Kimitoshi Ono, kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 35 days.

(21) Appl. No.: 15/139,543

(22) Filed: Apr. 27, 2016

(65) Prior Publication Data

US 2016/0349490 A1     Dec. 1, 2016

(30) Foreign Application Priority Data

May 28, 2015 (JP) ................................ 2015-108091
Apr. 12, 2016 (JP) ................................ 2016-079834

(51) Int. Cl.
    *G02B 13/22* (2006.01)
(52) U.S. Cl.
    CPC .................................. *G02B 13/22* (2013.01)
(58) Field of Classification Search
    CPC ........... G02B 13/22; G02B 3/00; G02B 5/005
    USPC ......................................................... 359/633
    See application file for complete search history.

(56) References Cited

U.S. PATENT DOCUMENTS 5,999,327 A * 12/1999 Nagaoka ............. G02B 3/0087
                                                    359/654
6,639,653 B2   10/2003 Nagahama et al.
2002/0167652 A1 * 11/2002 Ueyama .................. G02B 3/00
                                                    355/67
2006/0119919 A1   6/2006 Watson et al.
2010/0110569 A1 *  5/2010 Lin ........................ G02B 7/021
                                                    359/819

(Continued)

FOREIGN PATENT DOCUMENTS

| EP | 1258743 | 11/2002 |
| EP | 2390630 | 11/2011 |
| EP | 2674730 | 12/2013 |

(Continued)

OTHER PUBLICATIONS

European Search Report dated Dec. 22, 2016, 9 pages.

*Primary Examiner* — William R Alexander
*Assistant Examiner* — Gary W O'Neill
(74) *Attorney, Agent, or Firm* — Rankin, Hill & Clark LLP

(57) ABSTRACT

A telecentric optical apparatus that is capable of suppressing an increase in the number of components as well as achieving high precision optical axis alignment, is provided. The telecentric optical apparatus of the present invention is characterized in that it is provided with: a first telecentric lens surface that is provided on an object side; a second telecentric lens surface that is provided on an image side and that shares a focus position with the first telecentric lens surface; and an optical path trimming part that is provided, between the first telecentric lens surface and the second telecentric lens surface, in an outside region, which is located on a side further out than a light passing region having a center thereof located at the focus position, and that changes an optical path such that a light beam incident on the outside region is prevented from contributing to image formation.

21 Claims, 12 Drawing Sheets

(56) References Cited

U.S. PATENT DOCUMENTS

2011/0031383 A1* 2/2011 Tobiason ................ G01D 5/34
250/231.1

FOREIGN PATENT DOCUMENTS

| JP | 3708845 | 10/2005 |
| JP | 2006-017818 | 1/2006 |
| JP | 2006017818 A * | 1/2006 |

* cited by examiner

TELECENTRIC OPTICAL APPARATUS

CROSS-REFERENCE TO RELATED APPLICATION

This non-provisional application claims priority under 35 U.S.C. § 119(a) from Japanese Patent Application No. 2015-108091, filed on May 28, 2015 and Japanese Patent Application No. 2016-079834, filed on Apr. 12, 2016, the entire contents of which are incorporated herein by reference.

BACKGROUND

Technical Field

The present invention relates to a telecentric optical apparatus having a telecentric lens provided on both the object side and the image side.

Background Art

Telecentric optical apparatuses having a telecentric lens provided on both the object side and the image side have a feature to the effect that, even when an object moves in the optical axis direction (the Z-direction), the size of the image remains unchanged in the X- and Y-directions, which are orthogonal to the Z-direction. For this reason, telecentric optical apparatuses are employed as optical systems for linear scales and image measuring apparatuses, and are widely used for, for example, wide-field one-time measurements, or the like, of objects with steps.

JP3708845B discloses a bi-telecentric optical system provided with a front group, which has positive refractive power as a whole, and a rear group, which has positive refractive power as a whole, wherein the back focus of the front group and the front focus of the rear group are arranged such that they coincide with each other, and an aperture stop is arranged at the coinciding focus position. Since various aberrations and the telecentricity (the angle of principle ray) of the main light beam of an off-axis luminous flux are well corrected, such bi-telecentric optical system is suitably used as an objective lens of an image process measuring device.

SUMMARY OF THE INVENTION

Problems to be Solved by the Invention

However, with the configuration where a telecentric lens is provided on both the object side and the image side and where an aperture stop (telecentric aperture) is provided at a focus position, the number of components increases and a high precision optical alignment of the respective parts is required. Failure to achieve a precise alignment generates issues such as deterioration of the telecentricity and a decrease in image sharpness.

An object of the present invention is to provide a telecentric optical apparatus that is capable of suppressing an increase in the number of components as well as achieving high precision optical axis alignment.

Means for Solving the Problems

In order to achieve the above object, a telecentric optical apparatus of the present invention is characterized in that it is provided with: a first telecentric lens surface that is provided on an object side; a second telecentric lens surface that is provided on an image side and that shares a focus position with the first telecentric lens surface; and an optical path trimming part that is provided, between the first telecentric lens surface and the second telecentric lens surface, in an outside region, which is located on a side further out than a light passing region having a center thereof located at the focus position, and that changes an optical path such that a light beam incident on the outside region is prevented from contributing to image formation.

According to such configuration, since the optical path trimming part is provided in the outside region, which is located on a side further out than the light passing region having its center located at the focus position, it is possible to prevent the light beam incident on the outside region from contributing to the image formation without providing a telecentric aperture in conformity to the focus position. This allows a light beam with good telecentricity to be obtained by way of preventing unnecessary light beams that are outside the light passing region from being mixed in.

In the telecentric optical apparatus of the present invention, the optical path trimming part may include a refractive surface that refracts the optical path to the outside. This allows the light beam incident on the outside region to be refracted to the outside and allows the unnecessary light beams that are outside the light passing region to be prevented from being mixed in.

In the telecentric optical apparatus of the present invention, the optical path trimming part may include a lens curved surface. This allows the light beams that pass through the optical path trimming part to be concentrated in the optical axis direction of the lens curved surface and allows the unnecessary light beams that are outside the light passing region to be prevented from being mixed in.

In the telecentric optical apparatus of the present invention, the optical path trimming part may include a roughened surface that diffuses a light beam incident on the outside region. This allows the light beam incident on the outside region to be diffused and allows the unnecessary light beams that are outside the light passing region to be prevented from being mixed in.

The telecentric optical apparatus of the present invention may include: a front-stage lens part that includes the first telecentric lens surface; and a rear-stage lens part that includes the second telecentric lens surface, wherein the optical path trimming part may be provided to at least either one of the front-stage lens part or the rear-stage lens part. This allows the optical path trimming part to be provided between the front-stage lens part and the rear-stage lens part and allows an optical apparatus to be configured so as to have telecentric lens surfaces on both sides simply by combining the two lens parts.

The telecentric optical apparatus of the present invention may further be provided with a fitting part that is provided between the front-stage lens part and the rear-stage lens part and that connects the front-stage lens part and the rear-stage lens part together by way of fitting. This allows the front-stage lens part and the rear-stage lens part to be positioned by way of fitting and allows easy and precise optical axis alignment to be performed even when the front-stage lens part and the rear-stage lens part are separate parts.

In the telecentric optical apparatus of the present invention, the fitting part includes a planar surface that is provided in the light passing region and that is orthogonal to an optical axis of the front-stage lens part and the rear-stage lens part. This allows the light beams that pass through the fitting part to travel without being refracted.

In the telecentric optical apparatus of the present invention, an intermediate region is provided between the front-stage lens part and the rear-stage lens part, and the optical path trimming part may refract the optical path depending on a difference between a refractive index of a region that configures the front-stage lens part or the rear-stage lens part and a refractive index of the intermediate region. This allows the light beams that pass through the optical path trimming part to be refracted to the outside depending on the refractive index difference.

In the telecentric optical apparatus of the present invention, the light transmissibility of the intermediate region may be lower than the light transmissibility of the region that configures the front-stage lens part or the rear-stage lens part. This allows the amount of light that passes through the optical path trimming part to be reduced.

In the telecentric optical apparatus of the present invention, a clearance gap maybe provided between the front-stage lens part and the rear-stage lens part in the light passing region. This allows no small gap to be formed, which generates interference fringes, in the light passing region between the front-stage lens part and the rear-stage lens part.

The telecentric optical apparatus of the present invention is further provided with a positioning mechanism that includes a reference hole provided in the respective outside regions of the front-stage lens part and the rear-stage lens part, wherein positioning of the front-stage lens part and the rear-stage lens part in an optical axis direction and a direction orthogonal to the optical axis direction may be achieved by means of the positioning mechanism. This allows reliable positioning of the front-stage lens part and the rear-stage lens part to be performed in the optical axis direction and the direction orthogonal to the optical axis direction.

DETAILED DESCRIPTION OF THE EMBODIMENTS

Hereinafter, embodiments of the present invention will be described based on the drawings. It should be noted that the same reference numbers are applied to the same members and that the description of a member that has already been explained will be omitted when appropriate in the following descriptions.

First Embodiment

Figure 1A:
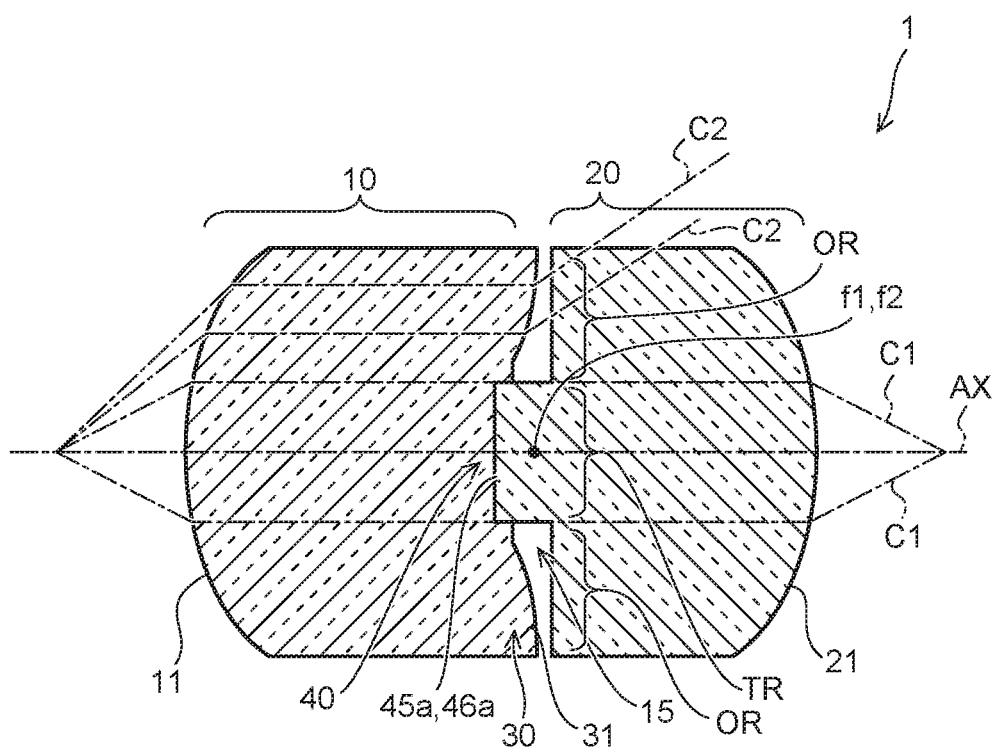
FIGS. 1A and 1B are schematic cross-sectional views illustrating a telecentric optical apparatus according to a first embodiment.
Figure 1B:
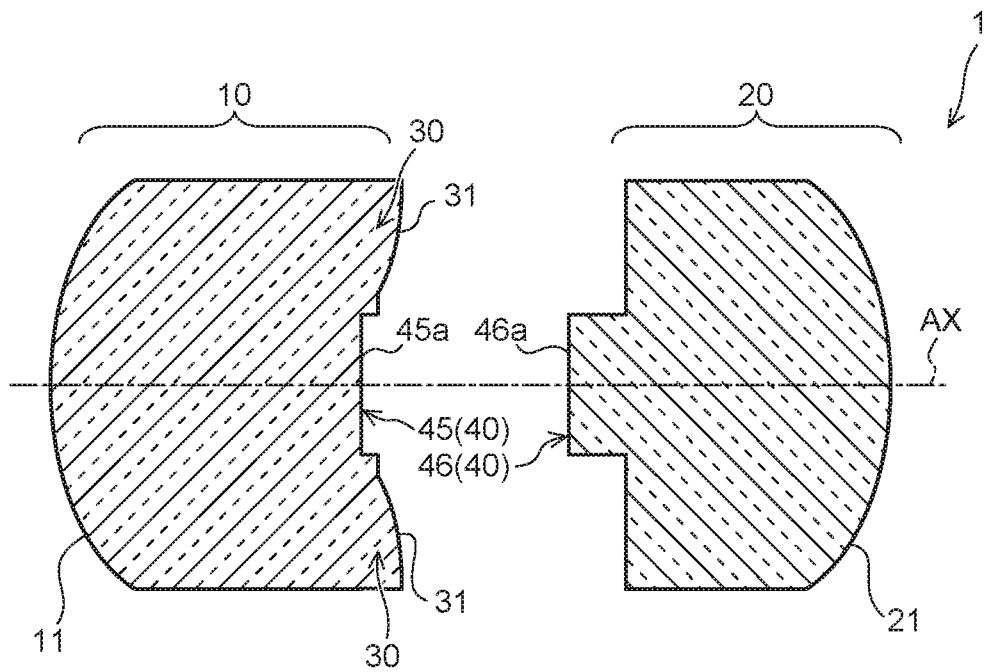

FIGS. 1A and 1B are schematic cross-sectional views illustrating a telecentric optical apparatus according to a first embodiment.

FIG. 1A represents an assembled state and FIG. 1B represents a separated state.

As shown in FIG. 1A, the telecentric optical apparatus 1 according to the present embodiment is provided with a front-stage lens part 10 that is arranged on the object side and a rear-stage lens part 20 that is arranged on the image side. The front-stage lens part 10 and the rear-stage lens part 20 are each of substantially cylindrical form. A first telecentric lens surface 11 is provided on the object side of the front-stage lens part 10 and a second telecentric lens surface 21 is provided on the image side of the rear-stage lens part 20. The front-stage lens part 10 and the rear-stage lens part 20 are connected together along an optical axis AX.

In the telecentric optical apparatus 1, the focus position f1 of the first telecentric lens surface 11 provided on the front-stage lens part 10 and the focus position f2 of the second telecentric lens surface 21 provided on the rear-stage lens part 20 coincide with each other. In this way, an optical system is obtained wherein, even when the distance with respect to an object changes in the direction of the optical axis AX, the size of the image remains unchanged in the directions orthogonal to the optical axis AX.

In the telecentric optical apparatus 1 according to the present embodiment, a light passing region TR is provided between the first telecentric lens surface 11 and the second telecentric lens surface 21, wherein the light passing region TR has its center located at the focus positions f1, f2. The light passing region TR is a region with its center located at the focus positions f1, f2 on the optical axis AX and with a predetermined radius. Among the light beams that are incident from the first telecentric lens surface 11, a light beam C1 that passes through the light passing region TR exits from the second telecentric lens surface 21.

In the telecentric optical apparatus 1, an optical path trimming part 30 is provided in an outside region OR, which is located on a side further out than the light passing region TR which is between the first telecentric lens surface 11 and the second telecentric lens surface 21. The optical path trimming part 30 serves a role of changing the optical paths such that the light beams incident on the outside region OR are prevented from contributing to the image formation. In the present embodiment, the optical path trimming part 30 has a refractive surface 31 that refracts the optical paths to the outside.

In this way, a light beam C2 that exits from the optical path trimming part 30, among the light beams that are incident from the first telecentric lens surface 11, is refracted to the outside (to the side away from the optical axis AX) by means of the refractive surface 31.

Here, various forms, such as a lens shape (including a spherical lens shape, an aspherical lens shape, a Fresnel lens shape, and the like), a planar surface shape (including a planar surface that is oblique to the optical axis AX, and the like), a rough surface shape, or the like, may be employed for the shape of the refractive surface 31, as long as it is capable of trimming the optical path.

In the telecentric optical apparatus 1, an intermediate region 15 is provided between the front-stage lens part 10 and the rear-stage lens part 20, more specifically, between the refractive surface 31 and the rear-stage lens part 20. In the example shown in FIG. 1A, the intermediate region 15 contains a space. Since the space is provided, the optical path is refracted depending on the refractive index difference of light between the refractive surface 31 and the space.

Accordingly, the optical path is refracted to the outside depending on the shape of the refractive surface 31 or on the refractive index difference between the refractive surface 31 and the intermediate region 15, and thus, a light beam C2 that travels toward the optical path trimming part 30, among the light beams that are incident from the first telecentric lens surface 11, is refracted away from the optical axis AX, and only the light beam C1 that travels toward the light passing region TR exits from the second telecentric lens surface 21.

In the telecentric optical apparatus 1, a fitting part 40 is provided between the front-stage lens part 10 and the rear-stage lens part 20. As shown in FIG. 1B, the fitting part 40 is a part where a concave part 45 and a convex part 46 are fitted into each other. The concave part 45 is provided on the front-stage lens part 10 and the convex part 46 is provided on the rear-stage lens part 20; however, it should be noted that the concave part 45 may be provided on the rear-stage lens part 20 and the convex part 46 may be provided on the front-stage lens part 10.

Alignment between the front-stage lens part 10 and the rear-stage lens part 20 is carried out by way of the concave part 45 and the convex part 46 fitting into each other. The position of the fitting part 40 corresponds to the position of the light passing region TR in the telecentric optical apparatus 1. Planar surfaces 45a and 46a are provided at the parts where the concave part 45 and the convex part 46 are fitted together and make contact with each other. The planar surfaces 45a and 46a are surfaces that are orthogonal to the optical axis AX. The planar surface 45a is the bottom surface of the concave part 45 and the planar surface 46a is the projected surface of the convex part 46. The concave part 45 and the convex part 46 are fitted into each other up to a position where the planar surfaces 45a and 46a abut against each other.

Figure 2A:
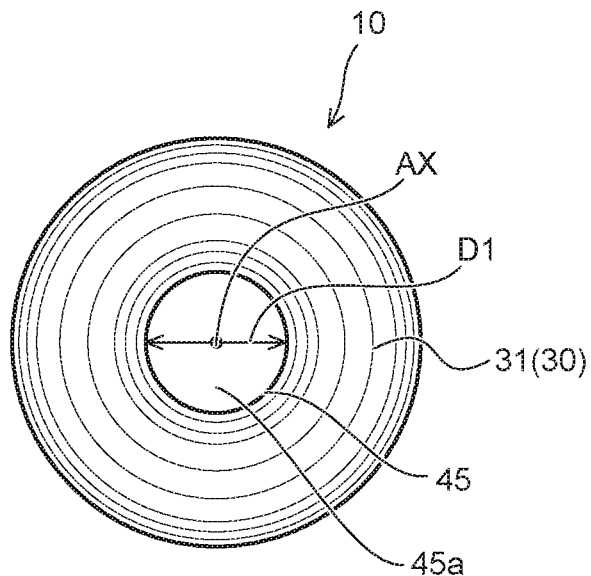
FIGS. 2A and 2B are respectively elevational views of a front-stage lens part and a rear-stage lens part.
Figure 2B:
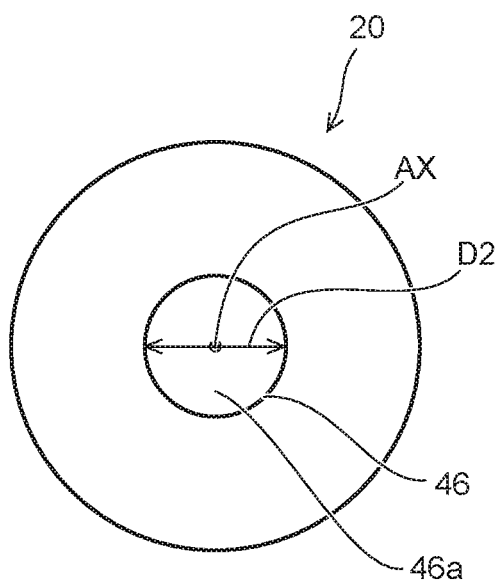

FIGS. 2A and 2B are respectively elevational views of the front-stage lens part and the rear-stage lens part.

FIG. 2A represents an elevational view of the front-stage lens part 10 as seen from the side of the concave part 45 along the optical axis AX. FIG. 2B represents an elevational view of the rear-stage lens part 20 as seen from the side of the convex part 46 along the optical axis AX.

As shown in FIG. 2A, the concave part 45 is provided in the middle of the front-stage lens part 10. The concave part 45 has an inner diameter D1. The refractive surface 31 of the optical path trimming part 30 is provided around the concave part 45.

As shown in FIG. 2B, the convex part 46 is provided in the middle of the rear-stage lens part 20. The convex part 46 has an outer diameter D2. The outer diameter D2 of the convex part 46 and the inner diameter D1 of the concave part 45 are set to the fitting dimensions by means of which the alignment of the convex part 46 and the concave part 45, with respect to each other, is fixed.

The front-stage lens part 10 and the rear-stage lens part 20 are formed from, for example, a glass mold or a plastic mold. The concave part 45 of the front-stage lens part 10 and the convex part 46 of the rear-stage lens part 20 are produced by way of molding. Thus, a precise alignment of the front-stage lens part 10 and the rear-stage lens part 20 can be easily carried out, by way of combining the concave part 45 and the convex part 46 together through fitting, with the optical axis AX serving as a base.

According to the telecentric optical apparatus 1 provided with the above configuration, since the optical path trimming part 30 is provided in the outside region OR, which is located on a side further out than the light passing region TR having its center located at the focus positions f1, f2, it is possible to refract light beams that are outside the light passing region TR to the outside of the optical paths without providing a telecentric aperture in conformity to the focus positions f1, f2. More specifically, it is possible to remove unnecessary light beams that are outside the light-passing region TR and to obtain light beams with good telecentricity by way of merely connecting the front-stage lens part 10 and the rear-stage lens part 20 together through fitting, without providing a telecentric aperture.

Second Embodiment

Figure 3A:
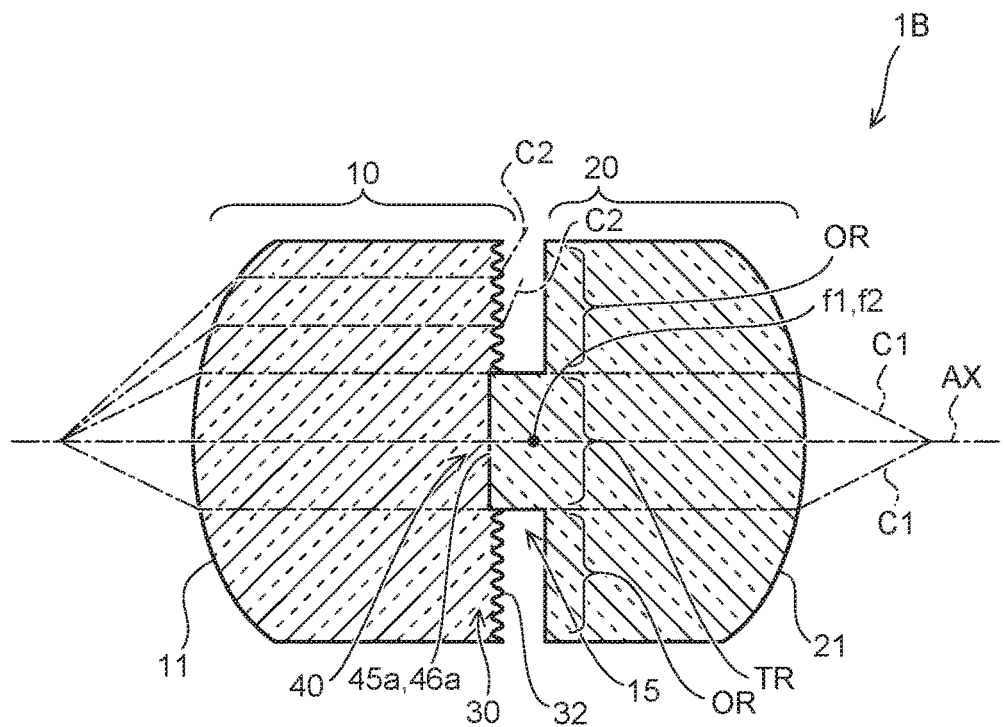
FIGS. 3A and 3B are schematic cross-sectional views illustrating a telecentric optical apparatus according to a second embodiment.
Figure 3B:
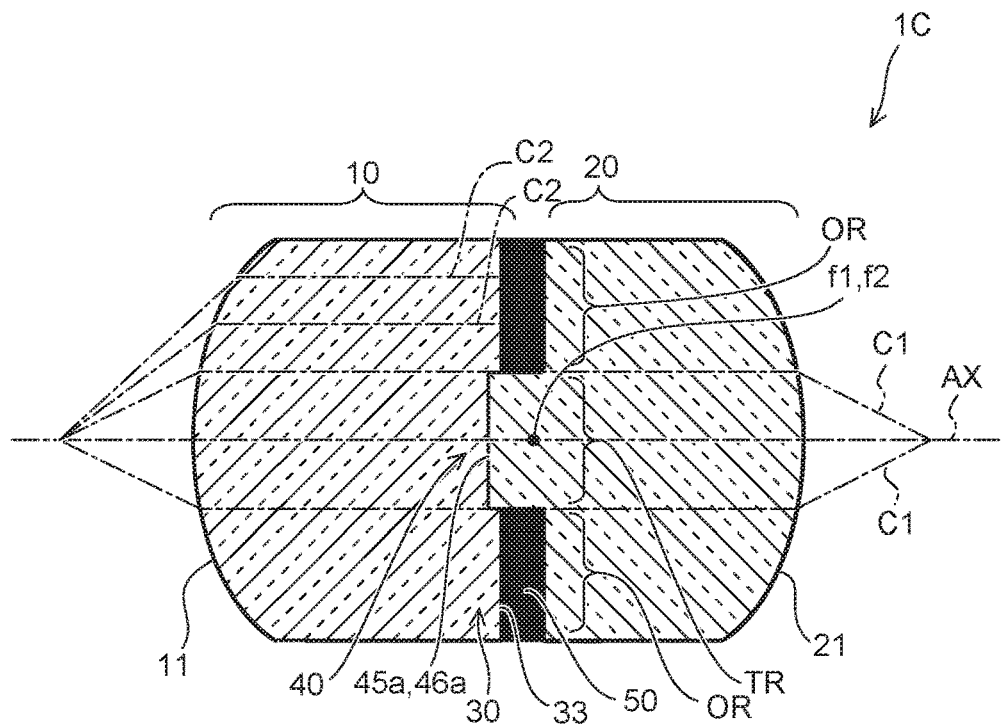

FIGS. 3A and 3B are schematic cross-sectional views illustrating a telecentric optical apparatus according to a second embodiment.

In the telecentric optical apparatus 1B shown in FIG. 3A, a roughened surface (a rough surface 32) is provided on the optical path trimming part 30. The rough surface 32 is a surface which is opposite to the rear-stage lens part 20 of the optical path trimming part 30 and which diffuses light beams C2 incident on the optical path trimming part 30. In this way, unnecessary light beams that are outside the light passing region TR can be prevented from being mixed into the rear-stage lens part 20.

It should be noted that, in the illustration of FIG. 3A, the rough surface 32 is obtained by roughening the planar surface that is orthogonal to the optical axis AX and it refracts the light beams C2 into different directions depending on the incident positions. Accordingly, the rough surface 32 is not made so as to refract the optical paths only to the outside, as with the above-described refractive surface 31. However, the refractive surface 31 itself that refracts the optical paths to the outside may be roughened.

In the telecentric optical apparatus 1C shown in FIG. 3B, an embedded part 50 is provided between the front-stage lens part 10 and the rear-stage lens part 20. The embedded part 50 is obtained by embedding a material (i.e. a low transmissibility material) having a light transmissibility lower than that of the front-stage lens part 10 in the intermediate region 15. The embedded part 50 serves as a light-shielding membrane by embedding a material having a very low light transmissibility. With this, the amount of light that passes through the optical path trimming part 30 is reduced, and the unnecessary light beams that are outside of the light passing region TR can be prevented from being mixed into the rear-stage lens part 20.

It should also be noted that, in the illustration of FIG. 3B, a boundary surface 33 between the optical path trimming part 30 and the embedded part 50 is represented in a linear manner (i.e. by a planar surface); however, the boundary surface 33 may be the refractive surface 31 or the rough surface 32.

Third Embodiment

Figure 4A:
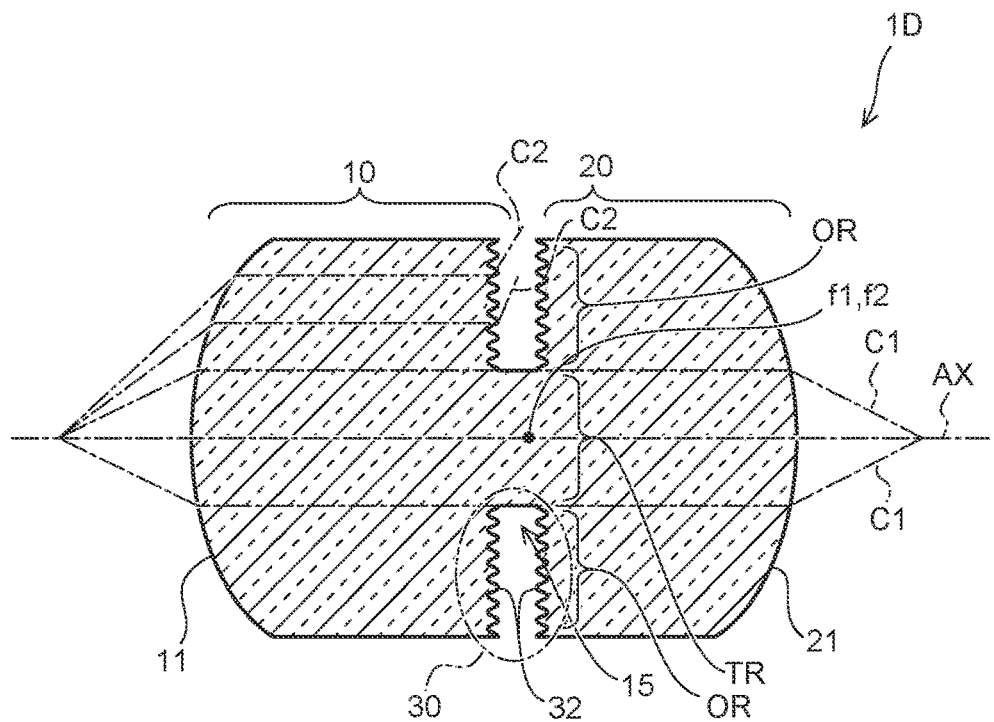
FIGS. 4A and 4B are schematic cross-sectional views illustrating a telecentric optical apparatus according to a third embodiment.
Figure 4B:
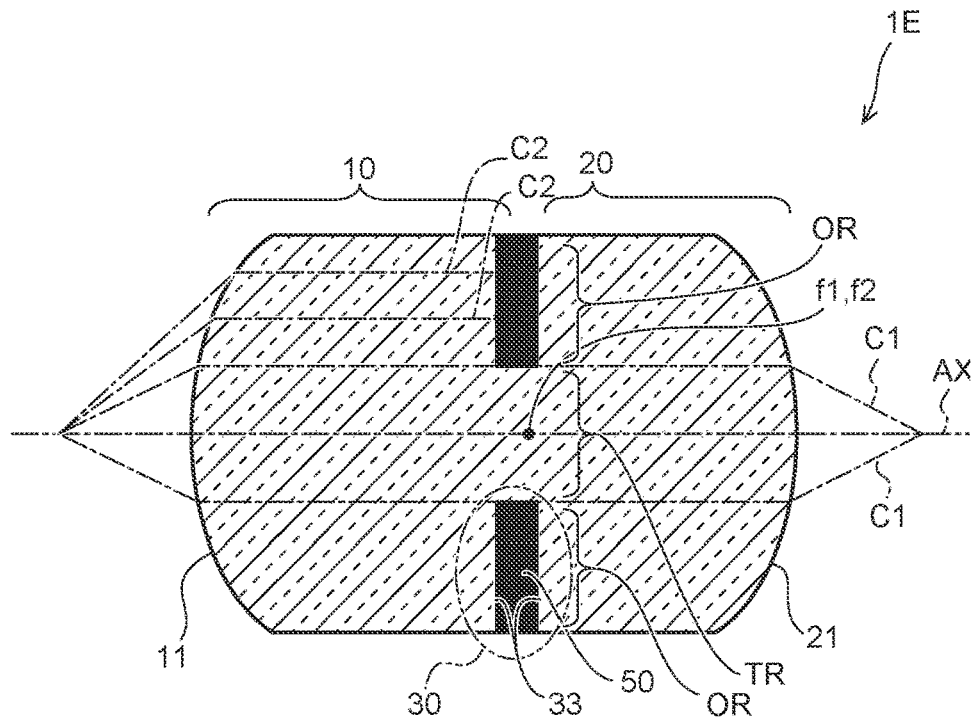

FIGS. 4A and 4B are schematic cross-sectional views illustrating a telecentric optical apparatus according to a third embodiment.

The telecentric optical apparatuses 1D and 1E according to the third embodiment have a configuration in which the front-stage lens part 10 and the rear-stage lens part 20 are integrated.

In the telecentric optical apparatus 1D shown in FIG. 4A, the optical path trimming part 30 is provided between the front-stage lens part 10 and the rear-stage lens part 20, which are integrated together. The surface of the optical path trimming part 30 on the side of the front-stage lens part 10 is roughened. In addition, the surface of the optical path trimming part 30 on the rear-stage lens part 20 is also roughened.

To produce the telecentric optical apparatus 1D, a substantially cylindrical member provided with the first telecentric lens surface 11 on one end and the second telecentric lens surface 21 on the other end is formed from a glass mold or a plastic mold, and then, a slit is made in the outer periphery of the middle part of this member. The intermediate region 15, which is a space, as well as the optical path trimming part 30 are formed by making the slit. Both surfaces of the optical path trimming part 30 are roughened by means of the surface roughness of the blade used for making the slit.

In the telecentric optical apparatus 1E shown in FIG. 4B, the embedded part 50 is provided between the front-stage lens part 10 and the rear-stage lens part 20, which are integrated together. The embedded part 50 is obtained by embedding a material (i.e. a low transmissibility material) having a light transmissibility lower than that of the front-stage lens part 10 in the intermediate region 15. With this, the amount of light that passes through the optical path trimming part 30 is reduced.

To produce the telecentric optical apparatus 1E, a substantially cylindrical member provided with the first telecentric lens surface 11 on one end and the second telecentric lens surface 21 on the other end is formed from a glass mold or a plastic mold, and then, a slit is made halfway in the outer periphery of the middle part of this member. The intermediate region 15, which is a space, is formed by making the slit. Then, the embedded part 50 is formed by embedding the low transmissibility material in the intermediate region 15.

In both the telecentric optical apparatuses 1D and 1E shown in FIGS. 4A and 4B, since the front-stage lens part 10 and the rear-stage lens part 20 are integrated together, the alignment of their optical axes is unnecessary. In addition, the number of components can be reduced.

Fourth Embodiment

Figure 5A:
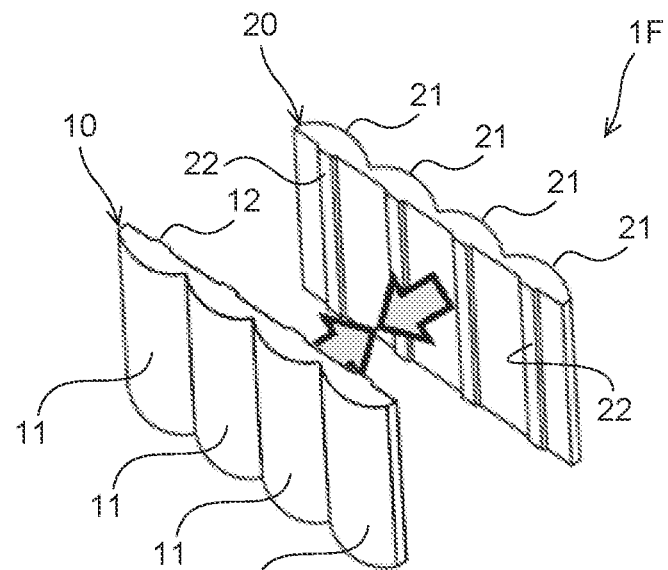
FIGS. 5A to 5C are schematic perspective views illustrating a telecentric optical apparatus according to a fourth embodiment.
Figure 5B:
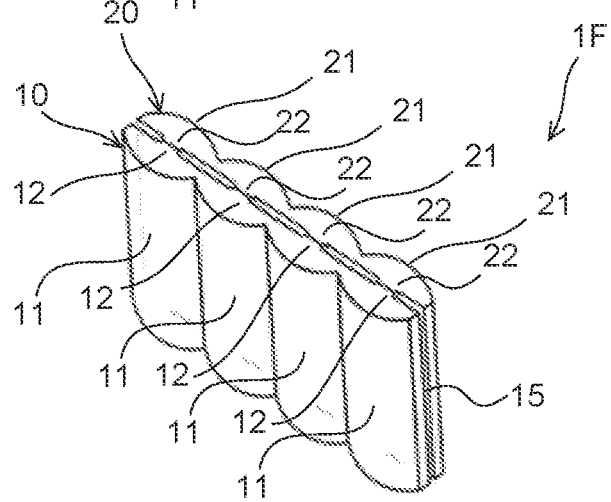
Figure 5C:
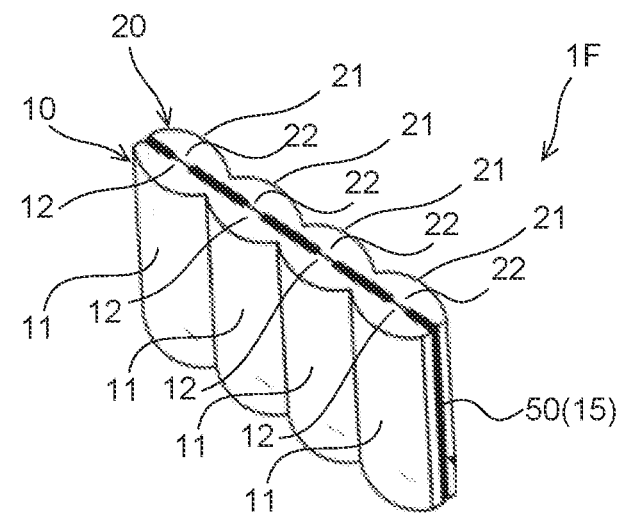

FIGS. 5A to 5C are schematic perspective views illustrating a telecentric optical apparatus according to a fourth embodiment.

The telecentric optical apparatus 1F according to the present embodiment is a lenticular type in which a plurality of lens parts are arranged. The telecentric optical apparatus 1F has a configuration in which four cylindrical lenses are arranged.

Four first telecentric lens surfaces 11 are provided on the front-stage lens part 10 in a corresponding manner with respect to the four cylindrical lenses, and four second telecentric lens surfaces 21 are provided on the rear-stage lens part 20 in a corresponding manner with respect to the four cylindrical lenses.

FIGS. 5A to 5C illustrate a method of producing the telecentric optical apparatus 1F in sequence.

First, as shown in FIG. 5A, each of the front-stage lens part 10 and the rear-stage lens part 20 are formed from a glass mold or a plastic mold. Convex parts 12 and 22 that extend in the longitudinal direction of the lens are provided at parts of the front-stage lens part 10 and the rear-stage lens part 20 corresponding to the respective cylindrical lenses.

Subsequently, as shown in FIG. 5B, the front-stage lens part 10 and the rear-stage lens part 20 are overlaid with each other such that each other's convex parts 12 and 22 abut against each other. The front-stage lens part 10 and the rear-stage lens part 20 are fixed by means of an adhesive or a holding part that is not shown. Alignment of the front-stage lens part 10 and the rear-stage lens part 20 with respect to each other can be determined by the positional relationship of the convex parts 12 and 22. It should be noted that alignment may also be carried out with marks and irregularities that are not shown.

The intermediate region 15, being a gap, is generated between the front-stage lens part 10 and the rear-stage lens part 20 due to the fact that each other's concave parts 12 and 22 of the front-stage lens part 10 and the rear-stage lens part 20 abut against each other.

Subsequently, as shown in FIG. 5C, the embedded part 50 is formed by embedding a low transmissibility material in the gap, being the intermediate region 15. In this way, the telecentric optical apparatus 1F is completed.

With this telecentric optical apparatus 1F of the lenticular type, it is possible to provide an optical apparatus with a simple configuration and with good telecentricity without providing a telecentric aperture.

It should be noted that, although an example is described, in which the convex parts 12 and 22 are provided, in terms of the front-stage lens part 10 and the rear-stage lens part 20 shown in FIGS. 5A to 5C, the front-stage lens part 10 and the rear-stage lens part 20 may also be fitted into each other by means of the fitting part 40 that includes the concave part 45 and the convex part 46, as shown in FIG. 1.

Fifth Embodiment

Figure 6:
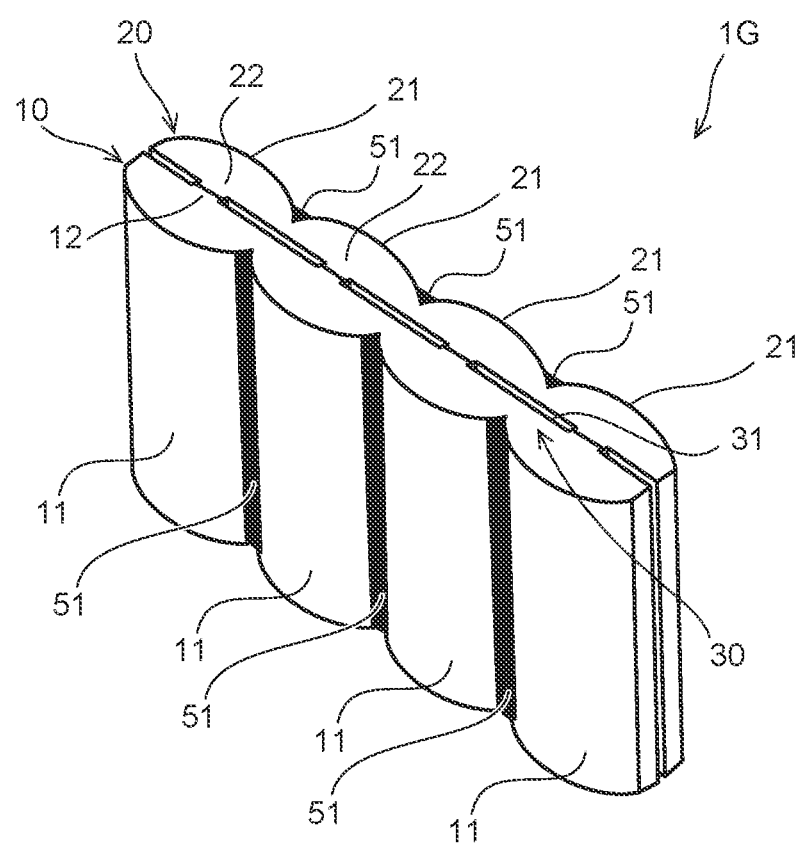
FIG. 6 is a schematic perspective view illustrating a telecentric optical apparatus according to a fifth embodiment.

FIG. 6 is a schematic perspective view illustrating a telecentric optical apparatus according to a fifth embodiment.

As shown in FIG. 6, the telecentric optical apparatus 1G according to the fifth embodiment is a lenticular type in which a plurality of lens parts are arranged. The telecentric optical apparatus 1G has a configuration in which four cylindrical lenses are arranged.

In the telecentric optical apparatus 1G, light absorption parts 51 are provided between the plurality of first telecentric lens surfaces 11 and between the plurality of second telecentric lens surfaces 21. In addition, the refractive surface 31 provided on each of the plurality of optical path trimming parts 30 is a lens surface which is adapted to concentrate light beams that have passed through the refractive surface 31 onto the light absorption parts 51. With such configuration, the light beams having their courses changed by the respective optical path trimming parts 30 are absorbed by the light absorption parts 51. As a result, such light beams do not re-enter the neighboring second telecentric lens surfaces 21.

Sixth Embodiment

Figure 7A:
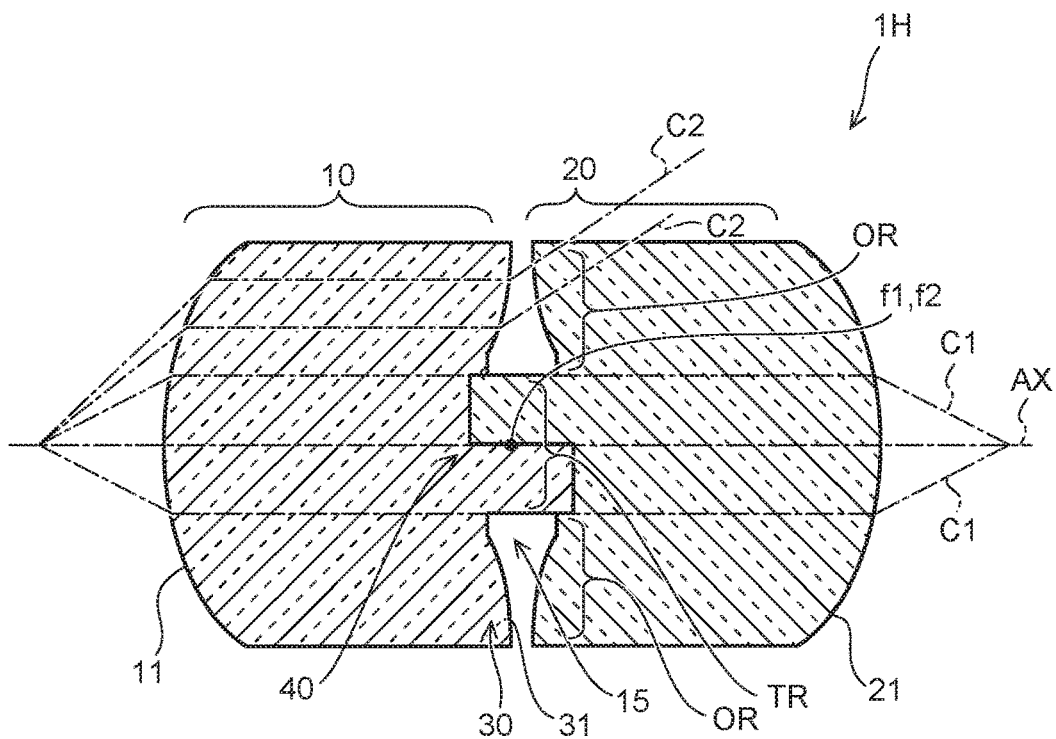
FIGS. 7A and 7B are schematic cross-sectional views illustrating a telecentric optical apparatus according to a sixth embodiment.
Figure 7B:
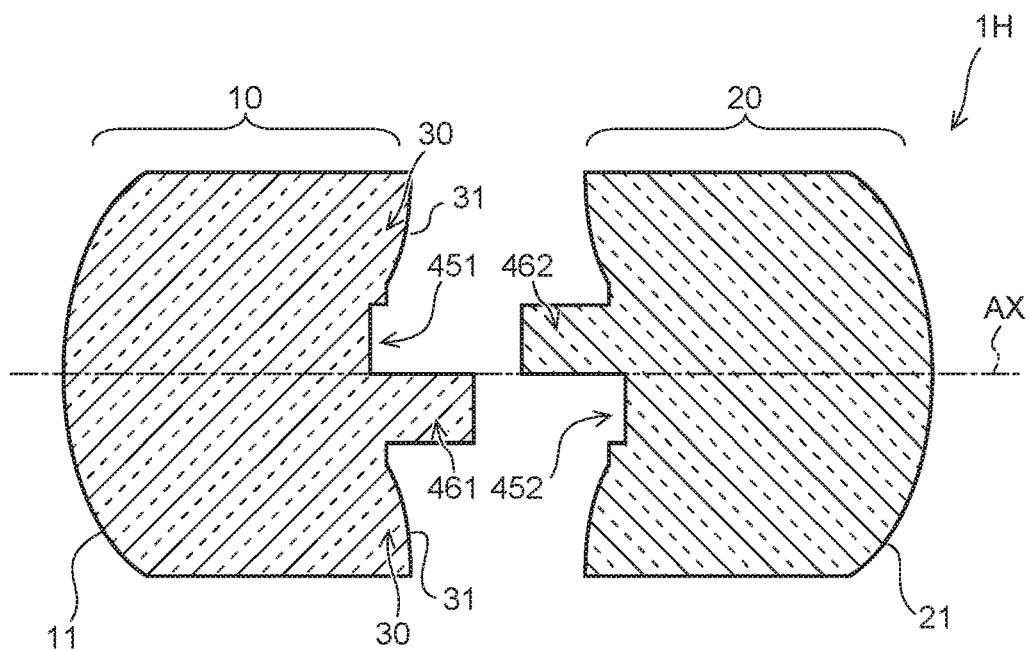

FIGS. 7A and 7B are schematic cross-sectional views illustrating a telecentric optical apparatus according to a sixth embodiment.

FIG. 7A represents an assembled state and FIG. 7B represents a separated state.

In the telecentric optical apparatus 1H, a concave part 451/452 and a convex part 461/462 are both respectively provided, as the fitting part 40, to the front-stage lens part 10 and the rear-stage lens part 20, between the front-stage lens part 10 and the rear-stage lens part 20.

The concave part 451 provided to the front-stage lens part 10 and the concave part 452 provided to the rear-stage lens part 20 have the same shape and the same size. In addition, the convex part 461 provided to the front-stage lens part 10 and the convex part 462 provided to the rear-stage lens part 20 also have the same shape and the same size. That is, the front-stage lens part 10 and the rear-stage lens part 20 have the same shape. When the front-stage lens part 10 and the rear-stage lens part 20 are to be fitted into each other, either one of the front-stage lens part 10 or the rear-stage lens part 20 is rotated by 180 degrees, with the optical axis AX being at the center, with respect to the other one, so that the concave part 451 and the convex part 462 face one another and so that the concave part 452 and the convex part 461 face one another, and then, the concave part 451 and the convex part 462 are fitted into each other and the concave part 452 and the convex part 461 are fitted into each other. In this way, the telecentric optical apparatus 1H is configured.

In the telecentric optical apparatus 1H according to the present embodiment, since the front-stage lens part 10 and the rear-stage lens part 20 have the same shape, the front-stage lens part 10 and the rear-stage lens part 20 can be formed by means of one single molding die.

Seventh Embodiment

Figure 8:
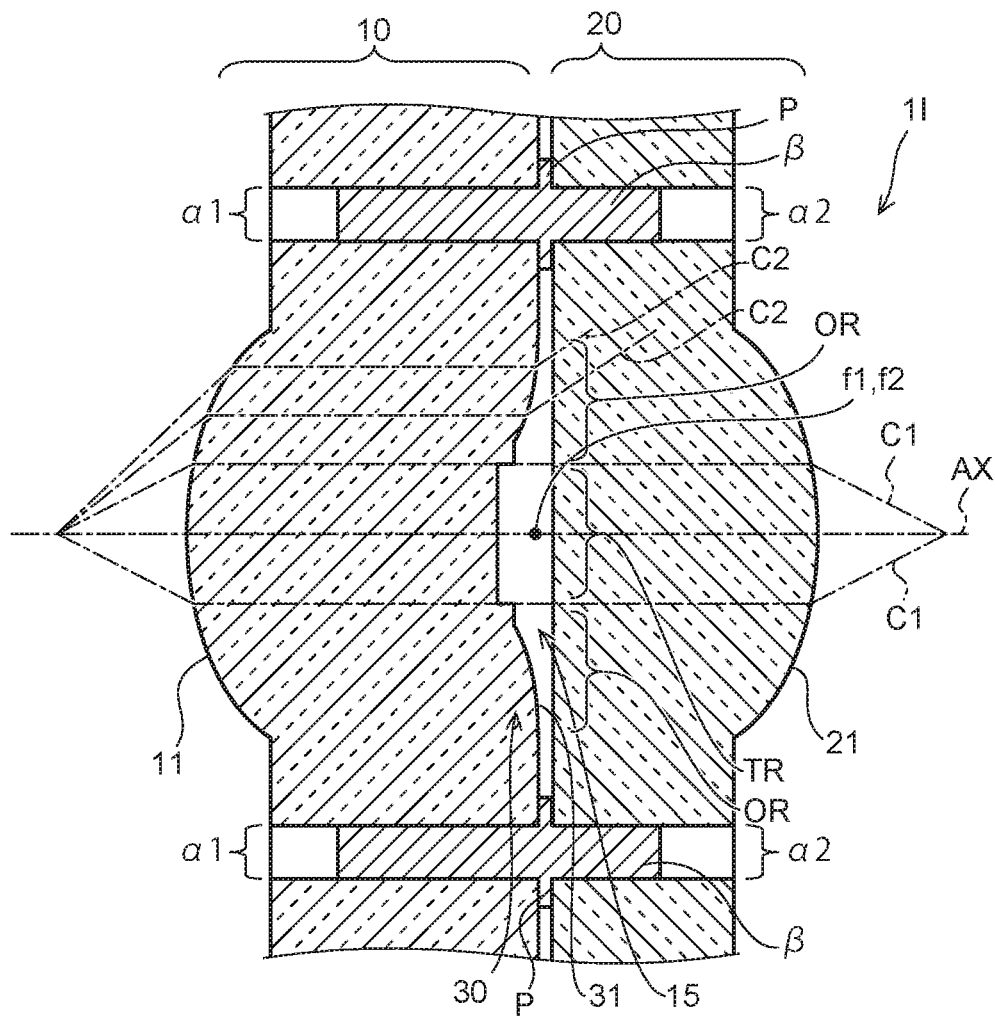
FIG. 8 is a schematic cross-sectional view illustrating a telecentric optical apparatus according to a seventh embodiment.
Figure 9:
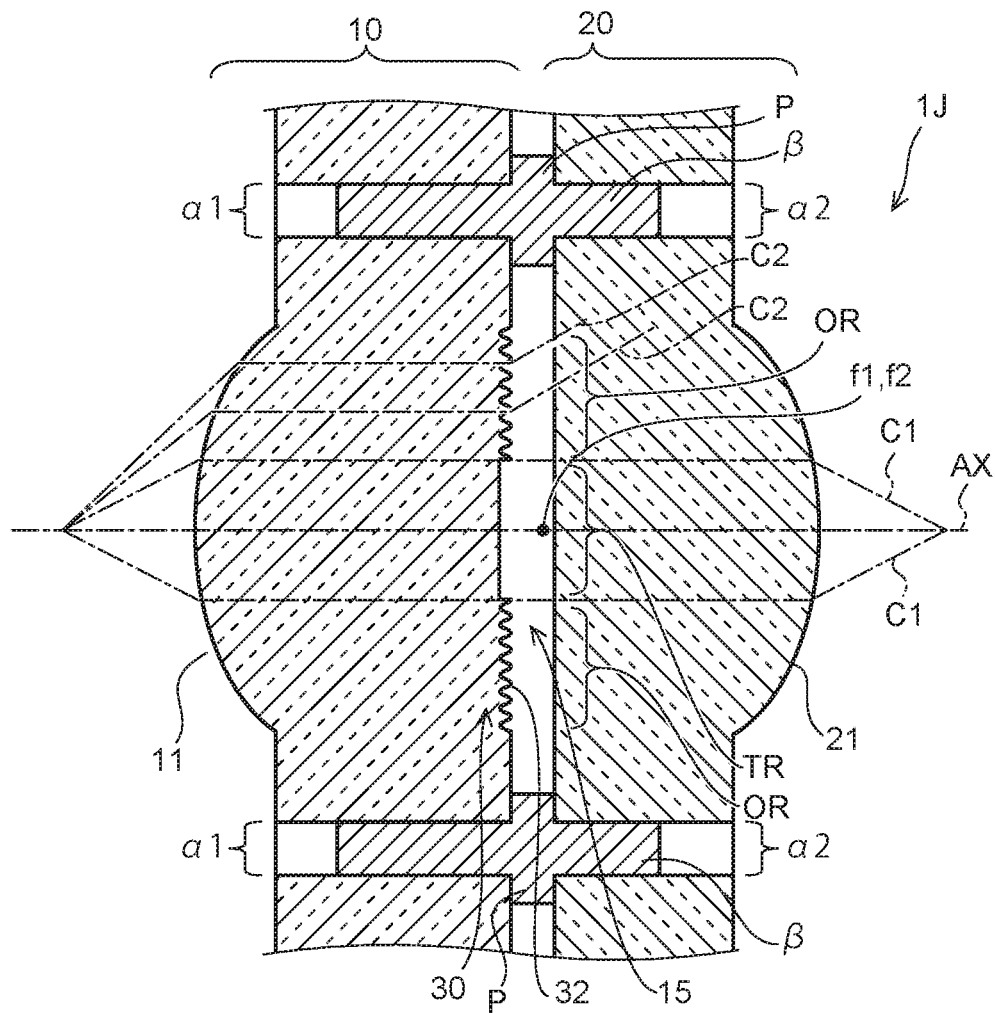
FIG. 9 is a schematic cross-sectional view illustrating a telecentric optical apparatus according to a seventh embodiment.
Figure 10:
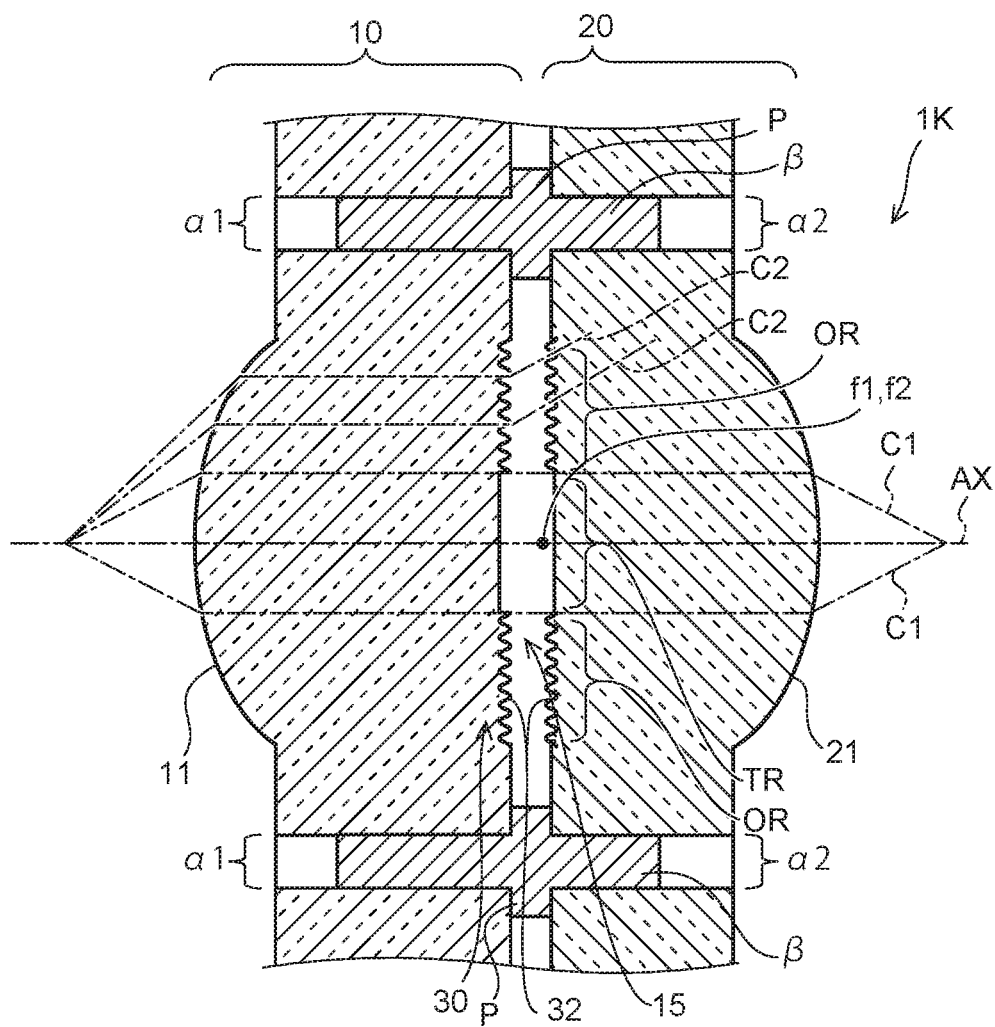
FIG. 10 is a schematic cross-sectional view illustrating a telecentric optical apparatus according to a seventh embodiment.

FIGS. 8 to 10 are schematic cross-sectional views illustrating telecentric optical apparatuses according to a seventh embodiment.

The telecentric optical apparatuses 1I, 1J and 1K according to the seventh embodiment have a configuration in which the front-stage lens part 10 and the rear-stage lens part 20 are combined without using a fitting part 40.

When the front-stage lens part 10 having the concave part 45 and the rear-stage lens part 20 having the convex part 46 are formed, there may be cases where the planar surface 45a of the concave part 45 and the planar surface 46a of the convex part 46 are not complete planar surfaces and where small irregularities having different shapes from each other are generated in the respective surfaces. When such planar surface 45a and planar surface 46a abut against each other, a small gap is formed between the abutting surfaces. Since such abutting surfaces are also included in the light passing region TR, when the light beam C1 passes therethrough, an interference fringe is generated due to the small gap and thus, there is a possibility that light intensity of the light beam C1 is attenuated. Accordingly, in the telecentric optical apparatuses 1I, 1J and 1K shown in FIGS. 8 to 10, the front-stage lens part 10 and the rear-stage lens part 20 are combined together without using a fitting part 40.

The telecentric optical apparatus 1I shown in FIG. 8 has a configuration in which the fitting part 40 of the telecentric optical apparatus 1 shown in FIGS. 1A and 1B is not provided. The telecentric optical apparatus 1J shown in FIG. 9 has a configuration in which the fitting part 40 of the telecentric optical apparatus 1B shown in FIG. 3A is not provided. The telecentric optical apparatus 1K shown in FIG. 10 has a configuration in which a rough surface 32 is also provided to the rear-stage lens part 20 of the telecentric optical apparatus 1J shown in FIG. 9.

In these telecentric optical apparatuses 1I, 1J and 1K, in order to combine the front-stage lens part 10 and the rear-stage lens part 20 without relying on the fitting part 40, a positioning mechanism as described below is used. More specifically, a reference hole $\alpha 1$ is provided on a side further out than the outside region OR of the front-stage lens part 10 and a reference hole $\alpha 2$ is provided on a side further out than the outside region OR of the rear-stage lens part 20, and a reference rod $\beta$ is inserted in these reference holes $\alpha 1$ and $\alpha 2$. In this way, the positioning mechanism for the front-stage lens part 10 and the rear-stage lens part 20 is configured. By means of this positioning mechanism, the positioning of the front-stage lens part 10 and the rear-stage lens part 20 in the direction along the optical axis AX and the direction orthogonal to the optical axis AX is achieved and a certain clearance gap is provided between the front-stage lens part 10 and the rear-stage lens part 20 in the light passing region TR.

In addition, a part P having a diameter larger than that of the reference holes $\alpha 1$ and $\alpha 2$ is provided about midway of the reference rod $\beta$. Depending on the thickness of this part P, the distance between the front-stage lens part 10 and the rear-stage lens part 20 is determined (positioning in the direction of the optical axis AX). The thickness of this part P is determined in such a manner that the focus positions of the front-stage lens part 10 and the rear-stage lens part 20 coincide with each other.

According to such positioning mechanism, no small gap will be formed, which generates interference fringes, in the light passing region TR between the front-stage lens part 10 and the rear-stage lens part 20 and unnecessary light beams can be removed by means of the refractive surface 31 of the optical path trimming part 30 which is provided in the outside region OR.

Application Examples

Figure 11:
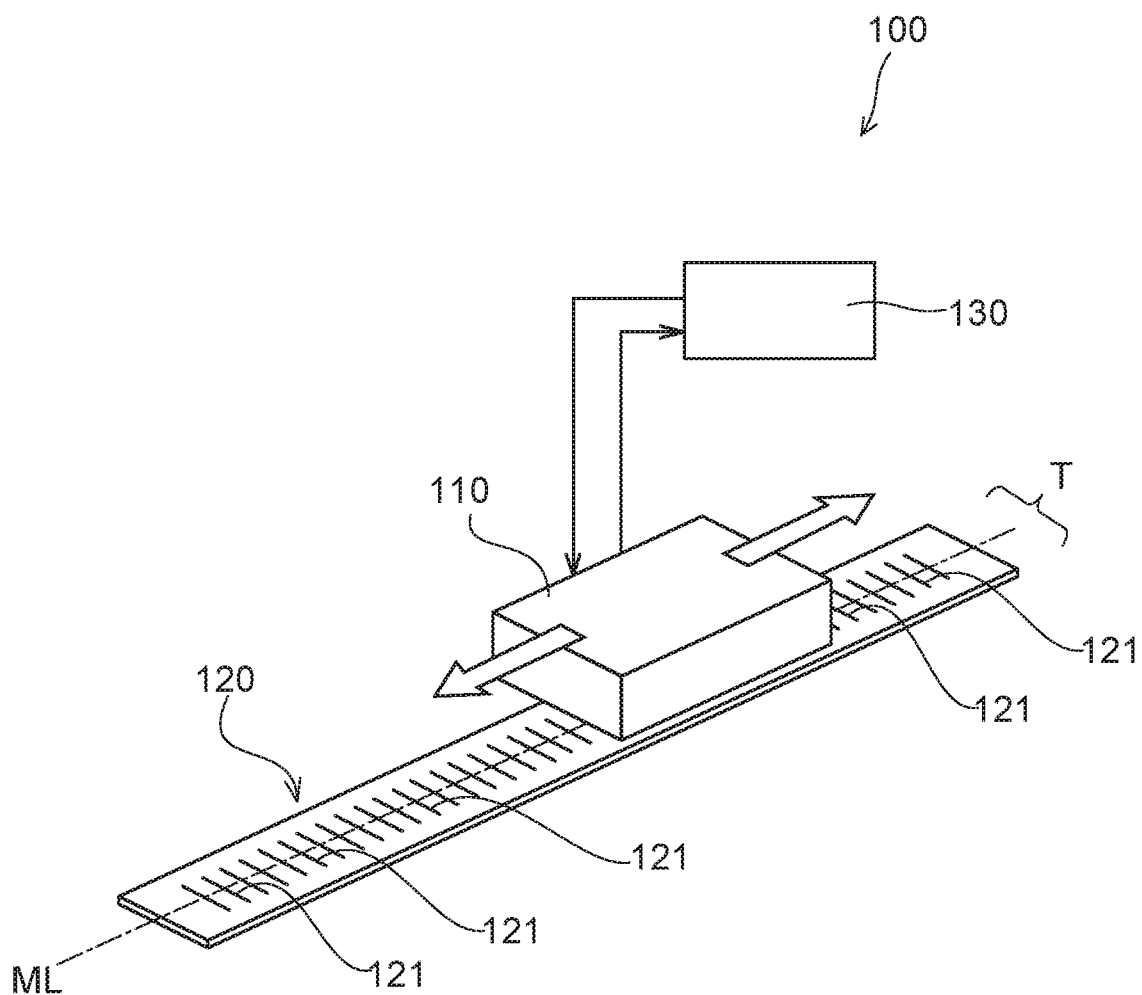
FIG. 11 is a schematic diagram showing an application example.
Figure 12:
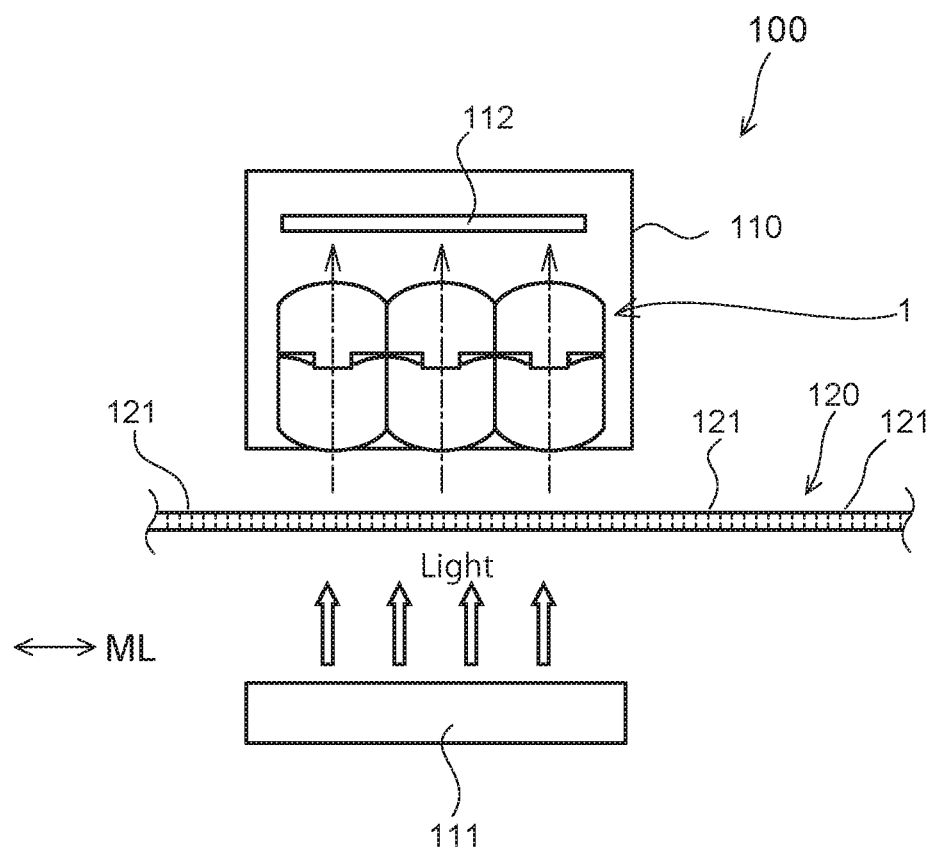
FIG. 12 is a schematic diagram showing an application example.

FIG. 11 and FIG. 12 are schematic diagrams showing application examples.

FIG. 11 and FIG. 12 show examples in which the telecentric optical apparatus 1 according to the present embodiment is applied to a linear scale 100. As shown in FIG. 11, the linear scale 100 is provided with a detection unit 110 and a scale 120. The scale 120 is provided with a plurality of measurement grids 121 that are arranged along a measurement baseline ML. The measurement grids 121 are, for example, slits. A control part 130 is connected to the detection unit 110. The linear scale 100 detects the relative positional relationship, along the measurement baseline ML, of the detection unit 110 and the scale 120. Signals captured at the detection unit 110 are sent to the control part 130 and an operation of the position of the detection unit 110 with respect to the measurement baseline ML is carried out.

FIG. 12 shows a configuration of the detection unit 110. A light receiving part 112 and the telecentric optical apparatus 1 according to the present embodiment are provided in the detection unit 110. In the linear scale 100, light that has exited from a light emitting part 111 and that has been transmitted through the measurement grids 121 is received at the light receiving part 112 via the telecentric optical apparatus 1, and the amount of displacement is measured by detecting changes in the amount of light received.

By making use of the telecentric optical apparatus 1 according to the present embodiment as the optical system of the detection unit 110 of such linear scale 100, the configuration of the optical system of the detection unit 110 can be simplified and high precision measurement can be carried out due to good telecentricity.

As has been described above, according to the present embodiments, a telecentric optical apparatus that is capable of suppressing an increase in the number of components and achieving high precision optical axis alignment, can be provided.

It should be noted that, although the embodiments are described as above, the present invention is not limited to such examples. For example, an example in which the optical path trimming part 30 is provided to the front-stage lens part 10 has been illustrated; however, the optical path trimming part 30 may be provided to the rear-stage lens part 20 or may be provided to both the front-stage lens part 10 and the rear-stage lens part 20. In addition, embodiments in which those skilled in the art have added or deleted components or have changed the design thereof, in an appropriate manner, with respect to the above-described respective embodiments, and embodiments in which features of the respective embodiments have been combined in an appropriate manner, are also contained in the scope of the present invention, as long as they are provided with the gist of the present invention.

INDUSTRIAL APPLICABILITY

In addition to linear scales, the present invention can be suitably used as an optical system for other measurement apparatuses, such as an image measuring apparatus, and optical apparatuses, such as a microscope.

What is claimed is:

1. A telecentric optical apparatus comprising:
   a front-stage lens comprising a first surface on an object side and a second surface on an image side, the first surface being a first telecentric lens surface; and
   a rear-stage lens comprising a first surface on the object side and a second surface on the image side, the second surface being a second telecentric lens surface that shares a focus position with the first telecentric lens surface,
   wherein at least one of the second surface of the front-stage lens and the first surface of the rear-stage lens is an optical path trimming part that is provided, between the first telecentric lens surface and the second telecentric lens surface, in an outside region, which is located on a side further out than a light passing region having a center thereof located at the focus position, and that changes an optical path such that a light beam incident on the outside region is prevented from contributing to image formation,
   the front-stage lens is in direct contact with at least a portion of the rear-stage lens at the light passing region,
   at least either one of the second surface of the front-stage lens or the first surface of the rear-stage lens comprises a concave part, at least another one of the second surface of the front-stage lens or the first surface of the rear-stage lens comprises a convex part, and
   the telecentric optical apparatus further comprises a fitting part where the concave part and the convex part are fitted into each other, the fitting part connecting the front-stage lens and the rear-stage lens together by way of fitting.

2. The telecentric optical apparatus according to claim 1, wherein the optical path trimming part includes a refractive surface that refracts the optical path to the outside.

3. The telecentric optical apparatus according to claim 2, wherein the refractive surface includes a lens curved surface.

4. The telecentric optical apparatus according to claim 1, wherein the optical path trimming part includes a roughened surface that diffuses a light beam incident on the outside region.

5. The telecentric optical apparatus according to claim 1, wherein the fitting part includes a planar surface that is provided in the light passing region and that is orthogonal to an optical axis of the front-stage lens and the rear-stage lens.

6. The telecentric optical apparatus according to claim 1, wherein
   an intermediate region is provided between the front-stage lens and the rear stage lens, and
   the optical path trimming part refracts the optical path depending on a difference between a refractive index of a region that configures the front-stage lens or the rear-stage lens and a refractive index of the intermediate region.

7. The telecentric optical apparatus according to claim 6, wherein a light transmissibility of the intermediate region is lower than a light transmissibility of the region that configures the front-stage lens or the rear-stage lens.

8. The telecentric optical apparatus according to claim 1, wherein no aperture stop is provided between the front-stage lens and the rear-stage lens.

9. The telecentric optical apparatus according to claim 1, wherein both of the second surface of the front-stage lens and the first surface of the rear-stage lens comprise the concave part and the convex part.

10. The telecentric optical apparatus according to claim 9, wherein the front-stage lens and the rear-stage lens have a same shape.

11. A telecentric optical apparatus comprising:
    a front-stage lens comprising a first surface on an object side and a second surface on an image side, the first surface being a first telecentric lens surface;
    a rear-stage lens comprising a first surface on the object side and a second surface on the image side, the second surface being a second telecentric lens surface that shares a focus position with the first telecentric lens surface; and
    an optical path trimming part that is provided, between the first telecentric lens surface and the second telecentric lens surface, in an outside region, which is located on a side further out than a light passing region having a center thereof located at the focus position, and that changes an optical path by refracting or diffusing a light beam incident on the outside region such that the light beam is prevented from contributing to image formation,
    wherein the optical path trimming part is formed by molding integrally with at least one of the first telecentric lens surface and the second telecentric lens surface,
    the first telecentric lens surface has a first convex surface at least at the light passing region, the first convex surface protruding toward the object side,
    the second telecentric lens surface has a second convex surface at least at the light passing region, the second convex surface protruding toward the image side, at least either one of the second surface of the front-stage lens or the first surface of the rear-stage lens comprises a concave part, at least another one of the second surface of the front-stage lens or the first surface of the rear-stage lens comprises a convex part, and the telecentric optical apparatus further comprises a fitting part where the concave part and the convex part are fitted into each other, the fitting part connecting the front-stage lens and the rear-stage lens together by way of fitting.

12. The telecentric optical apparatus according to claim 11, wherein the optical path trimming part includes a refractive surface that refracts the optical path to the outside.

13. The telecentric optical apparatus according to claim 12, wherein the refractive surface includes a lens curved surface.

14. The telecentric optical apparatus according to claim 11, wherein the optical path trimming part includes a roughened surface that diffuses a light beam incident on the outside region.

15. The telecentric optical apparatus according to claim 11, wherein the fitting part includes a planar surface that is provided in the light passing region and that is orthogonal to an optical axis of the front-stage lens and the rear stage lens.

16. The telecentric optical apparatus according to claim 11, wherein the optical path trimming part is provided to at least either one of the front-stage lens or the rear-stage lens.

17. The telecentric optical apparatus according to claim 16, wherein an intermediate region is provided between the front-stage lens and the rear stage lens, and the optical path trimming part refracts the optical path depending on a difference between a refractive index of a region that configures the front-stage lens or the rear-stage lens and a refractive index of the intermediate region.

18. The telecentric optical apparatus according to claim 17, wherein a light transmissibility of the intermediate region is lower than a light transmissibility of the region that configures the front-stage lens or the rear-stage lens.

19. The telecentric optical apparatus according to claim 11, wherein the telecentric optical apparatus does not comprise an aperture stop.

20. The telecentric optical apparatus according to claim 11, wherein both of the second surface of the front-stage lens and the first surface of the rear-stage lens comprise the concave part and the convex part.

21. The telecentric optical apparatus according to claim 20, wherein the front-stage lens and the rear-stage lens have a same shape.

* * * * *